Figure 1:
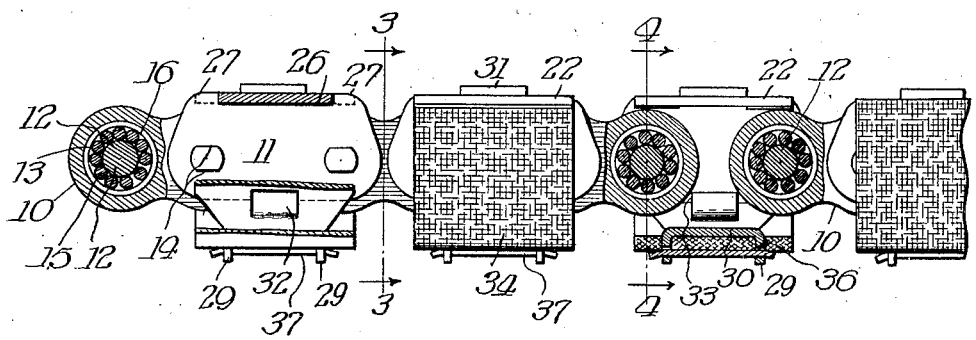

E. A. BOHLMAN.
METALLIC POWER BELT.
APPLICATION FILED SEPT. 3, 1912.

1,113,746.

Patented Oct. 13, 1914.

Witnesses:
H. G. Barriss
J. C. Carpenter

Inventor:
Ernest A. Bohlman
by Linthicum Betts Fuller
Atty's

UNITED STATES PATENT OFFICE.

ERNEST A. BOHLMAN, OF CEDAR RAPIDS, IOWA, ASSIGNOR TO JAMES E. CAGNEY, JR., OF CHICAGO, ILLINOIS.

METALLIC POWER-BELT.

1,113,746. Specification of Letters Patent. Patented Oct. 13, 1914.

Application filed September 3, 1912. Serial No. 718,189.

*To all whom it may concern:*

Be it known that I, ERNEST A. BOHLMAN, a citizen of the United States, residing at Cedar Rapids, in the county of Linn and State of Iowa, have invented certain new and useful Improvements in Metallic Power-Belts, of which the following is a specification.

My invention relates in general to power belts for transmitting power from one point to another, and more particularly to that class of belts known as metallic or chain belts, and aims to provide a belt of this type which will be strong, durable and efficient, and at the same time sufficiently flexible to permit it to be used on pulleys of small diameter and on pulleys closely mounted together.

Another object of my invention is to provide a power belt which will be so shaped as to accurately fit the grooves of grooved pulleys, each of the portions of the belt coming successively in contact therewith being exact duplicates of each other, and all being accurately shaped and dimensioned. While it is true that power belts of a number of types differing widely in details have been constructed to fit the grooves of grooved pulleys, they all have, so far as I am aware, been composed of a plurality of links and solid side bars, the side bars having their outer faces inclined to give the belt the form which adapts it to fit the grooved pulleys. These side bars have been rolled or milled to provide these inclined faces. Practice has demonstrated the fact that because of the necessity of these operations it has been found practically impossible to construct the side bars of the power belt all of uniform dimensions. Where the slightest variation in the form of the side bars is present the portions of the belt having side bars of larger dimensions become wedged more tightly in the grooves than the parts having the smaller dimensions, often causing the belt to stick in the pulleys, or at best providing an uneven distribution of the strain upon the links.

It is an object of this invention to so construct and arrange the parts of a power belt that an accurate and uniform fit with the pulleys will be produced throughout the entire length of the belt.

A still further object of my invention is to provide a belt of the character described wherein the friction members with which the belt is provided may be readjusted, removed and replaced without disarranging the relatively moving parts of the belt, permitting thereby these operations to be performed by unskilled persons without more than momentary interruption of the working of the belt.

Another aim of my invention is to provide a belt which will, while efficiently performing the other objects of the invention, be cheap to manufacture, easily assembled and durable in operation.

Further aims and many of the advantages of my invention will be apparent as it is better understood from the following description which taken in connection with the accompanying drawing discloses a preferred embodiment thereof.

Figure 2:
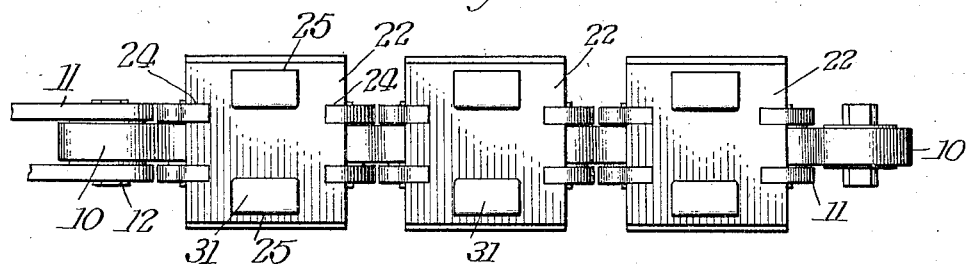
Figure 3:
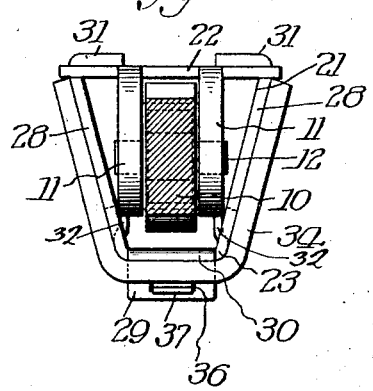

On the drawings:—Figure 1 is a side elevation of a portion of a power belt made in pursuance of my invention with parts broken away; Fig. 2 is a top plan view of the belt shown in Fig. 1; Fig. 3 is a vertical sectional view taken on the line 3—3 of Fig. 1; and Fig. 4 is a similar view taken on the line 4—4 of Fig. 1.

In the preferred embodiment of the invention illustrated in the drawing the power belt consists primarily of a plurality of links 10 and side bars 11, the side bars 11 being arranged in pairs and preferably rigidly connected together by pins 12 which are disposed through apertures 13 formed in the ends of the links. The ends of the pins 12 are reduced in diameter and provided with flattened surfaces 14 to permit them to fit tightly in elongated apertures formed in the side bars for the purpose. The central portion of each pin 12 is formed to provide a smooth cylindrical surface upon which a plurality of rollers 15 are adapted to bear. The rollers 15 are preferably inclosed in a housing 16 which is provided at each end thereof with an inwardly extending flange 17. These flanges are preferably made integral with the housing, and preferably extend in and bear upon the enlarged central portion of the pins 12.

Figure 4:
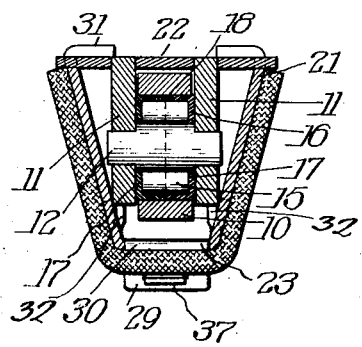

In Fig. 4 the housing 16 is shown as split circumferentially as at 18 to permit the housing and rollers to be readily mounted upon the pin, although it will be obvious that the housing may be made in one piece if desired, and the rollers placed in the housing before the pin is positioned.

In order that the lubricant may be prevented as much as possible from oozing out between the pin and the housing, the flanges 17 are constructed to fit accurately upon the cylindrical centrally enlarged portion of the pin 12, and I find it preferable to obtain this fit by constructing the housing of such dimensions that when the parts are first assembled the flanges 17 will be in snug engagement with the surface of the pin. When the parts are so constructed the movement of the belt when in actual operation will in a very short time wear away the edges of the flanges the desired amount to permit them to turn easily upon the pins and yet remain in contact therewith about the entire periphery of the pins. Further wearing is prevented by the rollers which at this point in the operation assume the strain placed upon the belt.

It is apparent that in providing a housing for the flanges which extends down over and embraces the ends of the rollers rather than providing disks closing the ends of the housing, such as have been previously employed, I have provided means for retaining within the housing any lubricant applied to the bearings, as the centrifugal force which usually urges the lubricant out between the disks and the ends of the housing encircling the rollers as the belt travels around a pulley will serve merely to dispose the lubricant against the inner surface of the walls of the housing, no crack being provided between the edge of the housing and the member retaining the roller bearings in position. It is apparent, therefore, that unless an excessive amount of lubricant be employed, no lubricant will be permitted to work out from the moving parts on to the friction members which contact with the pulleys.

The power belt is given a shape adapting it to fit the grooves of a grooved pulley by embracing each pair of side bars with a frame generally designated as 21, which is composed primarily of a top plate or spacing member 22 and a housing or arch 23 preferably formed of suitable metallic material. The plate 22, which is substantially flat, is provided with a pair of recesses 24 formed in each transverse side of the plate, and with elongated apertures 25 formed parallel to and adjacent each end thereof. The tops of the side bars are recessed intermediate their ends as at 26 to provide an upstanding lug 27 at each end thereof, which is adapted to enter into the recess 24 of the plate 22 to hold the same against movement relatively to the side bars. The housing 23 is formed from a metal strap bent into the arch shape shown to provide a pair of upwardly extending inclined walls 28. The material forming the intermediate portion connecting the bottom of the walls is left substantially flat, and the ends of this portion are severed from the bottom portion of the walls and bent downwardly substantially at right angles to form the lugs 29 whose use will be hereinafter defined. The edges at the top of the walls are preferably cut away at the ends to form upon the upper end of each wall a lug 31 adapted to be inserted through the apertures 25 in the plate 22. At the base of each wall 28 a lug 32 is formed by cutting the material of the wall and bending the portion thus set off inwardly at right angles to the bottom portion 30. Although the housings are not literally V-shaped, nevertheless, in view of the fact that belts of this general character adapted to coöperate with grooved pulleys are commercially known as V belts, I shall in lieu of a more accurate descriptive term hereinafter refer to the housings as being substantially V-shaped. The lower edges of the side bars 11 are cut away intermediate the ends thereof to provide recesses 33 to receive the lugs 32. Upon the outer faces of the two side walls 28 of each housing 23, and preferably extending beneath the bottom portion 30 is positioned a friction member 34 formed of a sheet of suitable material. The sheet is cut to permit the lugs 29 to extend therethrough, and these lugs are provided with recesses 36 which serve for the reception of a key 37 adapted to hold the sheet of frictional material in position. This key is constructed of a heavy piece of strap metal curved longitudinally to permit its ends to be simultaneously inserted in the recesses 36. After the frictional sheet of material 35 is positioned the ends of the key 37 are placed in the recesses 36 and pressure exerted upon the key, flattening it and forcing the ends through the recesses. When desired these ends may be slightly tapered or they may be bent as shown in the drawing either before or after the key is in position to prevent the key from being displaced when the belt is in use.

While in the present embodiment of the invention and in many adaptations thereof the friction sheets are described as secured merely at their bottoms, they may, if it is desired, be carried up over the spacing members and secured together or to the chain in any suitable manner.

It will be readily understood that accuracy in the inclination and dimension of the outer faces of the links shaped to engage the grooves of a grooved pulley may be easily and cheaply attained by the use of substantially V-shaped housings providing inclined side walls, and that these housings may be removed without disturbing the relatively moving parts of the belt should the housings become bent or broken in use, and that the friction sheets may also be replaced by merely removing the keys 37.

It will be obvious that various changes may be made in the form, construction and arrangement of the parts without departing from the spirit or scope of the invention, or sacrificing any of its advantages, the form hereinbefore described being merely one preferred embodiment thereof.

I claim:—

1. A power belt comprising a flexible chain composed of alternately arranged links and pairs of side bars, a substantially V-shaped housing secured to each pair of side bars, the side walls of said housing diverging upwardly to present inclined outer faces, a plate rigidly connected with the tops of said side bars and also rigidly connected with the upper ends of said housings, lugs on the side walls of each housing positioned to engage with corresponding depressions in the lower edges of the side bars whereby said housing is precluded from movement longitudinally of the chain, and a sheet of frictional material disposed over the outer faces of said housing.

2. A power belt comprising a flexible link chain composed of alternately arranged pivotally connected links and pairs of side bars, a metallic frame comprising a housing having upwardly diverging side walls and a spacing plate disposed over the side bars and rigidly connected with the upper ends of said housing, said side bars being provided with upwardly extending lips to engage in corresponding notches formed in the spacing plate and also provided with depressions on their lower edges to receive lugs struck inwardly from the side walls of said housing, said housing and spacing plate being thereby rigidly secured to the side bars, and a sheet of frictional material disposed about the housing.

3. A power belt comprising side bars arranged in pairs, links connecting the said side bars, a frame having inclined side members rigidly connected to and embracing a pair of side bars, and a sheet of frictional material secured to the said frame and disposed over the outer inclined faces of said side members of the said frame.

4. A power belt comprising side bars arranged in pairs, links alternating with said side bars and pivotally secured thereto, a spacing member secured to the top of a pair of the said side bars, and inclined side members secured together at one end and engaging said spacing member at their other ends.

5. A power belt comprising side bars arranged in pairs, links alternating with and pivotally secured to said pairs, a plate of suitable metallic material disposed above said side bars having a plurality of apertures therethrough, a housing of suitable material bent to provide inclined side members, the edges of the said housing being formed to protrude through the recesses in the said top plate, means for preventing movement of the said plate and housing longitudinally of the side bars, and means for securing the parts in position.

6. A power belt comprising side bars, links connecting said side bars, a sheet of frictional material disposed outside said side bars, and means located beneath said sheet for retaining the same in position.

7. A power belt comprising side bars, links connecting said side bars, a housing embracing said side bars, a sheet of frictional material disposed about said housing, and means extending beneath the housing through said sheet for securing the sheet in position.

8. A power belt comprising side bars, links connecting the same, a housing disposed about a pair of side bars and having a plurality of downwardly depending lugs, a sheet of frictional material disposed about the said housing and above the ends of the said lugs, and means engaging said lugs for securing said sheet in position.

9. A power belt comprising a pair of side bars, a housing disposed about said side bars and provided with a plurality of apertured lugs, a sheet of frictional material disposed about the said housing, and means disposed through the aperture in the said lugs to retain the sheet in position.

10. A power belt comprising a pair of side bars, a housing disposed about said side bars and provided with a plurality of apertured lugs, a sheet of frictional material disposed about the said housing, and a key positioned in the apertures of the said lugs and having its ends bent outwardly therefrom for retaining the said sheet in position.

11. A power belt comprising a flexible link-chain, composed of alternately arranged pivotally connected links and pairs of side bars, a substantially V-shaped metallic housing embracing each pair of side bars, said housings having their bases disposed beneath the side bars and their side walls diverging upwardly from said bases, spacing members disposed over the chain and between the upwardly projecting ends of said housing side walls whereby the side walls are held apart to present inclined outer faces, sheets of frictional material disposed outside said housings, and means for securing said housings and spacing members to the chain.

12. A power belt comprising a flexible link chain, composed of alternately arranged pivotally connected links and pairs of side bars, a substantially V-shaped metallic member straddling a pair of side bars, a spacing member of greater width than the chain disposed between the free ends of said V-shaped member, a layer of frictional material disposed over the outer faces of said V-shaped member, said spacing member, said V-shaped member and said frictional material being secured to the chain and held against movement longitudinally of said chain.

13. A power belt, comprising a plurality of pivotally connected links, a frame embracing one of said links and held against movement longitudinally of the belt, said frame comprising a top spacing member provided at its sides with recesses, and a housing embracing the said links and having ears disposed is said recesses and bent to engage the upper face of said spacing member.

ERNEST A. BOHLMAN.

Witnesses:
IRA J. WILSON,
M. A. KIDDIE.